Jan. 24, 1933.  W. JUFFA  1,895,249
CONTAINER FOR THE PACKING OF ARTICLES
Filed Feb. 21, 1931

INVENTOR
WILHELM JUFFA
BY
Richards & Geier
ATTORNEYS

Patented Jan. 24, 1933

1,895,249

UNITED STATES PATENT OFFICE

WILHELM JUFFA, OF ILMENAU, GERMANY

CONTAINER FOR THE PACKING OF ARTICLES

Application filed February 21, 1931, Serial No. 517,471, and in Germany February 24, 1930.

This invention relates to a container for the packing of cylindrical articles of fragile material provided with a foot, especially of measuring, mixing and hydrometer cylinders of glass, porcelain and the like.

Such articles were hitherto packed in wood wool. The layer of wood wool between the individual articles had to be sufficiently thick, to prevent breakage of the articles under all conditions. Apart from the troublesome and time-wasting work involved and from the dirty and, owing to the dust developed, unhygienic manner of working, the employment of wood wool required a considerable amount of waste space so that only a relatively very small number of articles could be accommodated in a container. Moreover the danger of breakage was not absolutely prevented as it was impossible to make the layers of wood wool of absolutely uniform thickness at all points. The result was a certain amount of play for the articles in some places and losses through breakage caused by vibrations during transport.

These disadvantages are overcome according to the invention in a very simple and reliable manner.

The invention relates to a method of and a container for packing cylindrical articles of fragile material providel with a foot, especially measuring, mixing and hydrometer cylinders of glass, porcelain and the like.

The invention is characterized in that the articles are inserted in two layers in a container provided with partitions and adaped to be opened on both sides in inserting first half the glasses as first layer, missing every second compartment, after which the feet of the glasses in this first layer are covered on both sides with a perforated insert, the holes of which leave the nonfilled rows free. The glasses are then inserted as second layer in the compartments which have been left free, so that the feet of the two layers are separated by the inserts.

According to one method of packing according to the invention, half the glasses are inserted in two layers only from one side, the first layer being first inserted, one row and in each row to be filled one compartment being left free, whereupon, after the feet of the inserted glasses have been covered with a perforated insert, the second layer is inserted, in that in the rows left free the compartments are also filled and left free alternately and the glasses of the other half are then also inserted in two layers from the other side.

Another method of packing consists in that first half the glasses are inserted from the two sides alternately as first layer, missing one row alternately, and after the feet of this first layer have been covered with the inserts on both sides the remaining glasses are inserted in a similar manner alternately from the two sides as second layer.

The container for carrying out the method according to the invention is characterized in that, in a container provided with partitions and designed to be opened at both sides, perforated inserts are arranged on both sides for covering the first layer of glasses inserted into the compartments, which inserts leave free alternately one row and in the rows alternately one compartment and separate the feet of the first layer from those of the second layer.

Inside the outer walls of the container, that is between same and the compartments proper, a narrow space is provided for increasing the protection against external mechanical influences, said space corresponding to the width of the cylinder feet projecting beyond the outer row of compartments.

In the case of cylinders with an exceptionally wide foot, as chiefly occurs with very large cylinders, that is when the diameter of the foot is larger than twice the width of the compartment, the feet of cylinders arranged in one layer would, in the case of compartments provided only a single partition, come into contact or overlap laterally. In order to prevent this, special rows are provided between the individual rows of compartments for cylinders with relatively very wide feet, the width of these special rows corresponding to the actual size of the feet.

An embodiment of the invention is illustrated by way of example in the accompanying drawing, in which.

Figure 1:
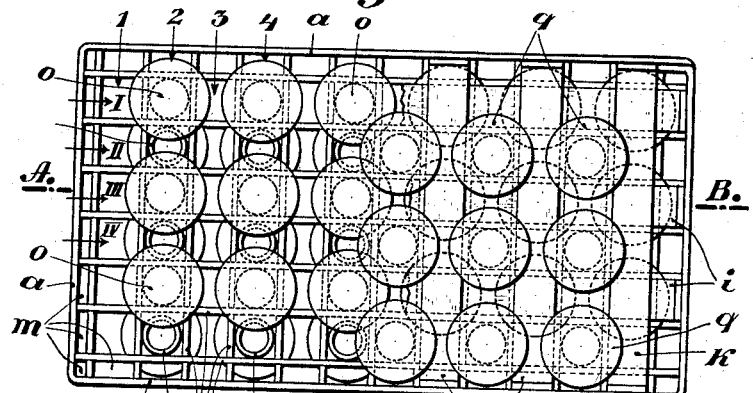
Fig. 1 shows in front elevation a container according to the invention partly filled with cylinders and partly fitted with an insert made of strips.
Figure 2:
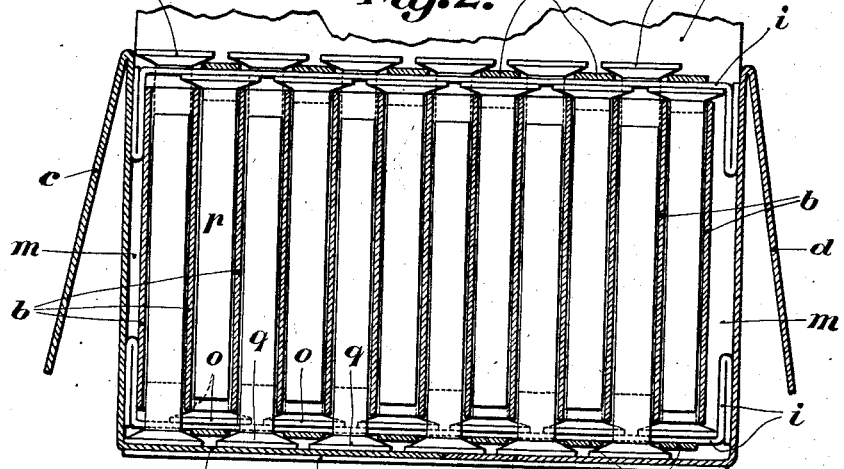
Fig. 2 is a longitudinal section on line A—B of Fig. 1.
Figure 3:
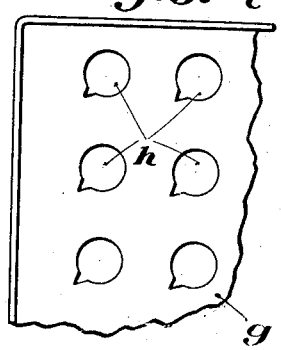
Fig. 3 shows a one-piece insert.
Figure 4:
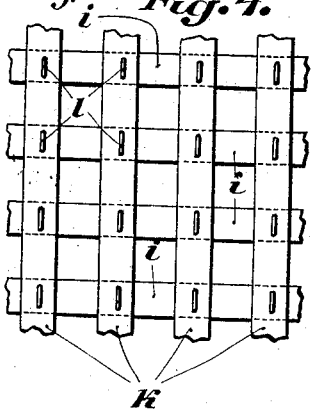
Fig. 4 shows an insert composed of strips.
Figure 5:
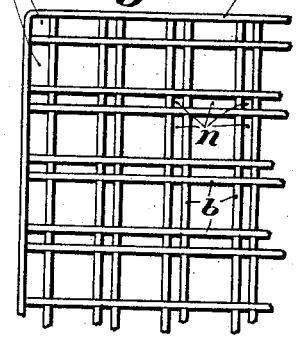
Fig. 5 is a front elevation of a container with internal protecting spaces.

The container $a$ is provided with internal partitions $b$ and adapted to be closed on each side with lids $c, d$ and $e, f$ respectively. The one-piece insert $g$ has holes $h$ (Fig. 3) which may be provided with a laterally extending slot at one point. According to a second form of construction, illustrated in Fig. 4, the insert is composed of longitudinal strips $i$ and transverse strips $k$, which are connected at the points of intersection by clips $l$. The container $a$ is provided with external protecting spaces $m$. The container according to Fig. 5 has further internal protecting spaces $n$.

The filling of the container with cylinders is effected in the following manner. The cylinders $o$ are first inserted into the compartments 2, 4, 6 etc. of the rows I, III, V. The cylinders $p$ are then inserted from the opposite side into the compartments, 1, 3, 5 etc., of the same rows I, III, V. An insert $g$ or an insert composed of the strips $i$ and $k$ is then placed on the feet of the cylinders $o$ introduced from the first side. The compartments 1, 3, 5 etc. of the rows II, IV, VI are then filled with cylinders and, after the feet of the cylinders first inserted have been covered with an insert, the remaining holes 2, 4, 6 etc. of the rows II, IV, VI etc. are filled with cylinders from the other side. A number of rows in the vertical and horizontal direction is preferably selected, divisible by 2, because in this instance the inserts can be similarly perforated and the necessary relative displacement of the holes on the two sides is obtained by simply reversing the inserts, whereas if the number is not divisible by 2, the inserts must be different, that is provided with displaced holes.

I claim:

1. The means for packing articles having a cylindrical stem and a laterally projecting foot portion, said means comprising a container, partitions forming rows of compartments within said container, lids for two sides of said container, every second compartment of every second row receiving a series of articles with their foot portions projecting beyond said partitions on one side of said container, intermediate compartments of the same rows receiving a second series of articles with their foot portions projecting beyond said partitions on the opposite side of said container, an insert having openings at least equal to the diameter of the stems of the articles, said insert being situated between the foot portions of the first-mentioned series of articles and the foot portions of a third series of articles situated in every second compartment of intermediate rows, the third-mentioned series of articles projecting through the openings of said insert and having foot portions situated on the first-mentioned side of said container, and a second insert having openings at least equal to the diameter of the stems of the articles and situated between the foot portions of the second-mentioned series of articles and the foot portions of a fourth series of articles situated in intermediate compartments of intermediate rows, the last mentioned series of articles projecting through the openings of the second-mentioned insert and having foot portions situated on the second-mentioned side of said container.

2. The means for packing articles having a cylindrical stem and a laterally projecting foot portion, said means comprising a container, partitions forming rows of compartments within said container, lids for two sides of said container, every second compartment of every second row receiving a series of articles with their foot portions projecting beyond said partitions on one side of said container, intermediate compartments of the same rows receiving a second series of articles with their foot portions projecting beyond said partitions on the opposite side of said container, an insert having openings at least equal to the diameter of the stems of the articles, said insert being situated between the foot portions of the first-mentioned series of articles and the foot portions of a third series of articles situated in every second compartment of intermediate rows, the third-mentioned series of articles projecting through the openings of said insert and having foot portions situated on the first-mentioned side of said container, and a second insert having openings at least equal to the diameter of the stems of the articles and situated between the foot portions of the second-mentioned series of articles and the foot portions of a fourth series of articles situated in intermediate compartments of intermediate rows, the last mentioned series of articles projecting through the openings of the second-mentioned insert and having foot portions situated on the second-mentioned side of said container, said inserts comprising longitudinal strips, transverse strips, and means for connecting said longitudinal strips with said transverse strips.

In testimony whereof I affix my signature.

WILHELM JUFFA.